US010860184B2

(12) United States Patent
Bodamer et al.

(10) Patent No.: US 10,860,184 B2
(45) Date of Patent: *Dec. 8, 2020

(54) SHARING GROUPS FOR CAPTURING DIGITAL MEDIA

(71) Applicant: Western Digital Technologies, Inc., San Jose, CA (US)

(72) Inventors: Roger Bodamer, San Carlos, CA (US); Chris Bourdon, San Francisco, CA (US); Laurent Baumann, Campbell, CA (US); Daniel Feldman, San Francisco, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,999

(22) Filed: Apr. 22, 2019

(65) Prior Publication Data
US 2019/0250784 A1 Aug. 15, 2019

Related U.S. Application Data

(63) Continuation of application No. 14/819,658, filed on Aug. 6, 2015, now Pat. No. 10,416,850.

(51) Int. Cl.
*G06F 3/0484* (2013.01)
*H04N 1/00* (2006.01)
(Continued)

(52) U.S. Cl.
CPC ........... *G06F 3/0484* (2013.01); *G03B 19/00* (2013.01); *G06F 3/04842* (2013.01);
(Continued)

(58) Field of Classification Search
CPC ............... G06F 3/0484; G06F 3/04883; G06F 3/04847; G06F 3/04842; H04N 1/00156;
(Continued)

(56) References Cited

U.S. PATENT DOCUMENTS 8,392,526 B2 * 3/2013 Mallet .................... G06Q 50/01
709/217
9,179,021 B2 * 11/2015 Latta .................. H04N 1/00137
(Continued)

FOREIGN PATENT DOCUMENTS

WO WO-2014040157 A1 * 3/2014 ......... H04N 1/00204

*Primary Examiner* — Nicholas Ulrich
(74) *Attorney, Agent, or Firm* — Chang & Hale LLP

(57) ABSTRACT

A plurality of sharing groups are available to a user, each mapping to a corresponding set of users. While a first sharing group is the currently-selected sharing group, a first one or more activations of a capture control is detected. Based on the first sharing group being the currently-selected sharing group when the first one or more activations occurred, one or more first digital media items captured in response are automatically shared with a first set of users corresponding to the first sharing group. While a second sharing group is the currently-selected sharing group, a second one or more activations of the capture control is detected. Based on the second sharing group being the currently-selected sharing group when the second one or more activations occurred, one or more second digital media items captured in response are automatically shared with a second set of users corresponding to the second sharing group.

20 Claims, 7 Drawing Sheets

(51) Int. Cl.
    *H04L 29/08*     (2006.01)
    *H04L 29/06*     (2006.01)
    *G06F 3/0488*     (2013.01)
    *G03B 19/00*     (2006.01)

(52) U.S. Cl.
    CPC ...... *G06F 3/04847* (2013.01); *G06F 3/04883* (2013.01); *H04L 63/104* (2013.01); *H04L 67/10* (2013.01); *H04L 67/1095* (2013.01); *H04L 67/306* (2013.01); *H04N 1/00127* (2013.01); *H04N 1/00156* (2013.01)

(58) Field of Classification Search
    CPC .. H04N 1/00127; G03B 19/00; H04L 67/306; H04L 67/1095; H04L 67/10; H04L 63/104; H04L 67/2842
    See application file for complete search history.

(56) References Cited

U.S. PATENT DOCUMENTS

| | | | | |
|---|---|---|---|---|
| 9,641,572 | B1* | 5/2017 | Yeskel | G06Q 50/01 |
| 2006/0182045 | A1* | 8/2006 | Anderson | H04L 67/06 |
| | | | | 370/260 |
| 2008/0133658 | A1* | 6/2008 | Pennington | H04L 67/1095 |
| | | | | 709/204 |
| 2009/0172129 | A1* | 7/2009 | Singh | H04L 29/06176 |
| | | | | 709/217 |
| 2009/0327885 | A1* | 12/2009 | Aoki | H04W 4/21 |
| | | | | 715/700 |
| 2012/0027256 | A1* | 2/2012 | Kiyohara | G06F 16/435 |
| | | | | 382/103 |
| 2012/0173638 | A1* | 7/2012 | Vymenets | G06Q 10/103 |
| | | | | 709/206 |
| 2012/0221639 | A1* | 8/2012 | Mallet | G06F 16/285 |
| | | | | 709/204 |
| 2013/0041948 | A1* | 2/2013 | Tseng | H04W 4/21 |
| | | | | 709/204 |
| 2013/0129232 | A1* | 5/2013 | Cok | H04N 1/00156 |
| | | | | 382/224 |
| 2014/0148091 | A1* | 5/2014 | Husar | H04W 4/06 |
| | | | | 455/3.01 |
| 2015/0013016 | A1* | 1/2015 | Kanter | H04L 67/10 |
| | | | | 726/28 |
| 2015/0172330 | A1* | 6/2015 | Kaplan | H04L 67/325 |
| | | | | 709/206 |
| 2015/0341590 | A1* | 11/2015 | Choe | G06K 9/00 |
| | | | | 348/207.1 |
| 2016/0050289 | A1* | 2/2016 | Cohen | H04L 67/306 |
| | | | | 709/204 |
| 2016/0088078 | A1* | 3/2016 | Wang | H04L 51/10 |
| | | | | 709/203 |
| 2017/0054858 | A1* | 2/2017 | Coelho | H04N 1/00196 |
| 2017/0310888 | A1* | 10/2017 | Wright | H04N 5/772 |

* cited by examiner

SHARING GROUPS FOR CAPTURING DIGITAL MEDIA

CROSS-REFERENCE TO RELATED APPLICATIONS

The present application is a continuation of U.S. patent application Ser. No. 14/819,658 filed on Aug. 6, 2015, entitled SHARING GROUPS FOR CAPTURING DIGITAL MEDIA, the disclosure of which is hereby incorporated by reference in its entirety.

FIELD

Embodiments described herein relate generally to computer systems, and more specifically, to techniques for capturing and sharing media.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users are taking a growing number of digital photos, digital video, and other forms of digital media. Digital media content is easily generated due to the prevalence of media capture devices on mobile devices. Many applications also allow for the sharing of individual digital media items or the sharing of digital media libraries. Such applications typically require an authorized user to select existing digital media items to share with other authorized users.

Thus, there is a need for sharing groups for capturing digital media.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for sharing groups for capturing digital media. A sharing group maps to a plurality of users. Digital media items, such as digital video and/or digital photos, are automatically shared among the plurality of users of a particular sharing group. That is, when a user captures a digital media item when a sharing group is selected, the digital media item is automatically shared with the other members of the sharing group. For example, in response to capturing the digital media item on a computing device, the digital media item may be uploaded to a server and associated with the particular sharing group. In one embodiment, no copy of the digital media item is automatically stored on a persistent storage of the computing device after the digital media item is shared.

The user may also view shared albums corresponding to sharing groups that the user belongs to. For example, the user may view a particular shared album corresponding to a particular sharing group. The particular shared album includes shared digital media items that were captured by any user belonging to the particular sharing group. The shared digital media items of the particular shared album may be displayed in an order that is based on the time the shared digital media items were captured. In one embodiment, initial media metadata is used to provide near-real-time display of a preview representing new digital media items captured by other users of the sharing group. The initial media metadata allows a preview of a new digital media item to be displayed in the shared album even before upload of the new digital media item from another computing device is completed.

Example System Overview

Figure 1:
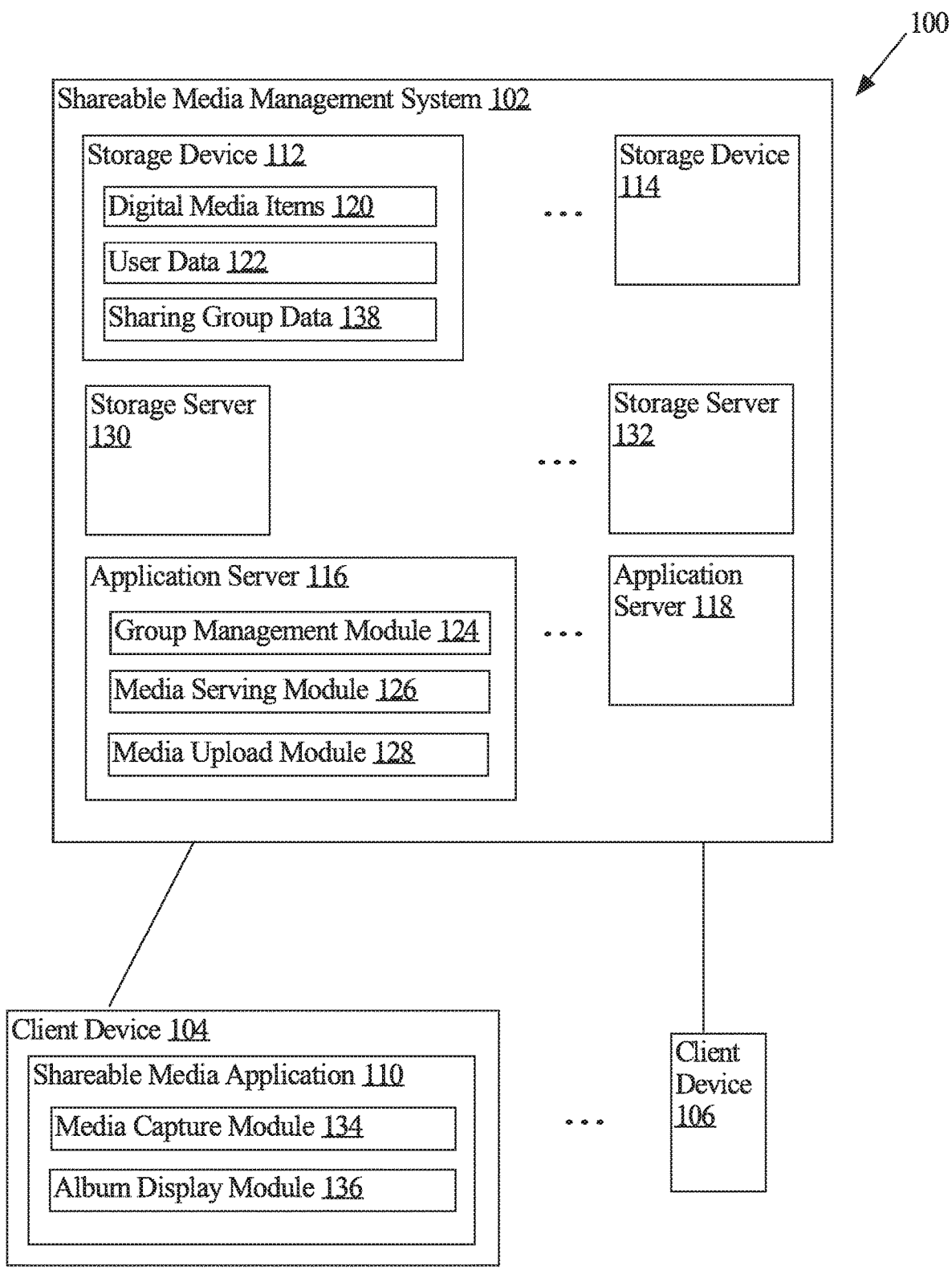
FIG. 1 is a block diagram depicting/illustrates an embodiment of a shareable media management system.

FIG. 1 is a block diagram depicting/illustrates an embodiment of a shareable media management system. A shareable media management system 102 is configured to manage sharing groups for capturing digital media. Each sharing group maps to a plurality of users. The plurality of users capture digital media using a plurality of client devices 104-106. Digital media items captured by users of a particular sharing group are automatically shared with other users of the particular sharing group.

The shareable media management system 102 includes one or more servers running on one or more server computer devices that are configured to perform shareable media management tasks. As used herein, the term "server" refers to one or more integrated software components and an allocation of computational resources, such as memory and processes on a computer for executing the integrated software components. The combination of the software and computational resources are dedicated to providing a particular type of function on behalf of clients of the server. The shareable media management system 102 may include one or more application servers 116-118 and one or more storage servers 130-132, which may run on one or more server computer devices. For example, the one or more application servers and/or one or more storage servers 130-132 may be implemented in a distributed system and/or in one or more cloud computing environments.

The shareable media management system 102 includes one or more application servers 116-118. An application server 116-118 includes a group management module 124, a media serving module 126 and a media upload module 128. Although the group management module 124, the media serving module 126 and the media upload module 128 are illustrated as blocks of an application server 116-118, one or more of the aforementioned modules may be implemented on separate server computer devices in communication with each other, such as via a private and/or public network. Although the group management module 124, the media serving module 126 and the media upload module 128 are illustrated as separate blocks, one or more of the aforementioned modules may be implemented as one or more integrated modules.

Sharing Groups

Shareable media management system 102 manages sharing groups for capturing digital media for a plurality of users. Each sharing group maps to a corresponding set of users. Digital media items are automatically shared among the plurality of users as soon as the digital media items are captured. The digital media items may include digital photos, digital videos, digital audio, other digital media, or any combination thereof. A user may belong to a plurality of sharing groups. In this case, each of the sharing groups is an available sharing group with respect to the user. The user may select a sharing group from the available sharing groups. Digital media items that are captured when a particular sharing group is the currently-selected sharing group are shared with the particular sharing group.

Typically, a sharing group maps to a plurality of users. However, in an embodiment, a sharing group may map to one user. For example, a single user may remain when one or more other users leave a particular sharing group. The sharing group may be maintained even if the sharing group has one user, such as so that one or more prior members may rejoin the sharing group, or so that one or more new members may join the sharing group. In one embodiment, a sharing group may be maintained when the sharing group maps to zero users.

Media Upload Module

The application server 116 includes a media upload module 128. The media upload module 128 processes one or more digital media items received from the client devices 104-106 for storage. In one embodiment, the media upload module 128 handles digital media items that are captured on a client device 104-106 using a shareable media application 110.

In one embodiment, when a particular user captures a digital media item on a client device 104-106, the digital media item is automatically uploaded to the shareable media management system 102. In one embodiment, no copy of the digital media item is automatically stored on a persistent storage of the client device 104-106 after the digital media item is automatically uploaded to the shareable media management system 102. In one embodiment, when no network access is available with respect to a device, a shared digital media item is stored locally on the device until the shared digital media item is successfully transmitted to the shareable media management system 102.

In one embodiment, after media upload module 128 receives a particular digital media item from a particular user, the media upload module 128 causes the particular digital media item to be stored in association with the particular user. For example, the media upload module 128 may cause a storage server 130-132 to store the particular digital media item. The association between the particular digital media item may be implicit, such as by storing the particular digital media item in a folder corresponding to the particular user. Alternatively and/or in addition, user data 122 corresponding to the particular user is updated with a reference to the particular digital media item. As shall be described in greater detail hereafter, the particular digital media item may be stored as one or more first blocks in a content-addressable storage system, and one or more second blocks more representing a folder associated with the particular user may be updated to include a reference to the one or more first blocks storing the particular digital media item.

The shareable media management system 102 may be configured to store both shared digital media items that are shared with a particular sharing group as well as unshared digital media items. When the media upload module 128 receives an unshared digital media item captured by a particular user on a client device 104-106, the media upload module 128 causes the unshared digital media item to be stored in association with the particular user.

When the media upload module 128 receives, from a particular user, a shared digital media item that is shared with a particular sharing group, the media upload module 128 causes the particular digital media item to be stored in association with the particular sharing group. The media upload module 128 may also cause the particular digital media item to be stored in association with the particular user. In one embodiment, the shared digital media item is stored in association with the particular user, and a reference to the shared digital media item is stored in association with the particular sharing group.

As shall be described in greater detail hereafter, the particular digital media item may be stored as one or more first blocks in a content-addressable storage system. In this case, one or more second blocks more representing a folder associated with the particular user may be updated to include a reference to the one or more first blocks storing the particular digital media item, and one or more third blocks more representing a folder associated with the particular sharing group may be updated to include a reference to the one or more first blocks storing the particular digital media item.

In one embodiment, media upload module 128 is configured to first receive initial media metadata when uploading a shared digital media item from a client device 104-106. For example, the initial media metadata may be a lower-resolution preview image, an aspect ratio of the new digital media item, GPS information, other location information, and/or a timestamp usable to determine an order that the new digital media item was captured with respect to other digital media items. The initial media metadata may be received from the client device 104-106 or may be generated by any component of the shareable media management system 102 upon receiving, initially processing, and/or storing the digital media item. Alternatively, the initial media metadata may be generated on the client side by the shareable media application 110, and the shareable media application 110 may automatically transmit the initial media metadata first.

The media upload module 128 may cause the initial media metadata to be associated with the corresponding sharing group before the entire shared digital media item is transferred. For example, additional references and/or blocks in a content-addressable storage system may be used to associate one or more pieces of initial media metadata with the sharing group.

By receiving and associating the initial media metadata with the sharing group before the entire digital media item is received and processed, the existence of the new digital media item may be made available to other users belonging to the sharing group at an earlier time. This allows for near real-time display of a preview representing the new digital media item on other client devices 104-106. The near real-time display of preview in a shared album shall be discussed in greater detail hereafter.

Media Serving Module

The application server 116 includes a media serving module 126. The media serving module 126 transmits data corresponding to digital media items for display on client devices 104-106. In one embodiment, when a particular user is using a particular client device 104-106, the media serving module 126 transmits data corresponding to digital media items in one or more shared albums.

When a particular shared album corresponding to a particular sharing group is displayed on a client device 104-106, the media serving module 126 provides the client device 104-106 data corresponding to shared digital media items belonging to the particular shared album, including shared digital media items captured on other client devices 104-106 and/or shared digital media items captured by other users. The shared digital media items belonging to the particular shared album were captured when the particular sharing group was selected on the device/s that captured the shared digital media items.

In one embodiment, when a particular shared album corresponding to a particular sharing group is displayed on a first client device 104-106, the media serving module 126 automatically transmits data corresponding to new digital media items that are captured on other client devices 104-106 in association with the particular sharing group. Thus, when a particular shared album is displayed, it is also updated as other users add new digital media items. The data corresponding to the new digital media items are automatically transmitted as soon as the shareable media management system 102 is aware of the new digital media items. For example, when media upload module 128 receives, from a second client device 104-106, a new digital media item shared with the particular sharing group, the media serving module 126 automatically transmits data corresponding to the new digital media item to a first client device 104-106 on which the particular shared album is currently displayed.

In one embodiment, when the media upload module 128 receives a shared digital media item from another client device 104-106, initial media metadata corresponding to the shared digital media item is received first. The initial media metadata is associated with the corresponding sharing group before the entire shared digital media item is transferred, and the media serving module 126 transmits the initial media metadata to the first client device 104-106 to cause the first client device 104-106 to display a preview representing the new digital media item. This results in the near real-time update of a shared album when a new digital media item is added to the shared album.

In one embodiment, different levels of preview are available for a particular digital media item. For example, an aspect ratio may be the roughest level of preview data available, followed by a lowest-resolution preview image and optionally followed by higher-resolution preview images. The data for different levels of preview may be generated server-side, such as by the media upload module 128, or client side, such as by the shareable media application 110. Furthermore, data for different levels of preview may be generated both client-side and server-side. The different levels of preview may be used to provide near real-time updates of newly added digital media items as well as to manage bandwidth and other network issues. In one embodiment, a shared digital media item is a digital video, and data for the digital video file is transmitted from a client device during capture of the digital video (i.e. before capture is complete), such that other members of the sharing group can immediately view a portion of the digital video.

Live Change Updates

When a particular shared album corresponding to a particular sharing group is displayed on a first client device 104-106, the media serving module 126 may automatically transmit data corresponding to changes to the particular shared album. In addition to the capture of new digital media items by other users, the changes to the particular shared album may include the departure of a member, the deletion of a digital media item of the particular shared album, the generation of subsequent media metadata associated with a digital media item of the particular shared album, or any other change to the particular shared album. Subsequent media metadata may include GPS information, other location information, tagging, or any other media metadata generated at the request of any user belonging to the particular sharing group or otherwise generated by the shareable media management system 102.

In one embodiment, the media serving module 126 also transmits data corresponding to unshared digital media items that were captured by a particular user. For example, the media serving module 126 may provide data corresponding to unshared digital media items to the user that generated the unshared digital media items. That is, the user is able to access personal digital media items that are stored and managed by the shareable media management system 102.

Notifications

In one embodiment, notifications are sent to one or more members of a shared album in response to a change or another event associated with the shared album. For example, notifications may be generated for the addition of a member, the departure of a member, the addition of a new digital media item, the deletion of a digital media item, and/or other events associated with the shared album. Notifications may be generated by the media serving module 126 or another component of the shareable media management system 102. The notifications may include emails, text messages, mobile notifications, or any other notification that may be sent over the Internet, another computer network, a wireless telecommunication network, another telecommunication network, or any combination thereof. In one embodiment, one or more user preferences regarding notifications are stored by the shareable media management system 102.

In one embodiment, in-app notifications are generated on a client device 104-106 by the shareable media application 110. In-app notifications may be generated when the shareable media application 110 is running in the foreground and/or the background of the client device 104-106. In one embodiment, one or more user preferences regarding notifications are stored locally on the client device 104-106.

Group Management Module

The application server 116 includes a group management module 124. The group management module 124 manages sharing groups. For example, the group management module 126 may create a sharing group, delete a sharing group, add one or more users to a sharing group, and/or remove one or more members from a sharing group. The group management module 124 may also manage one or permissions for the one or more users of a sharing group. These permissions may include the ability to add and/or remove users from the sharing group, as well as the ability to view, add, remove and/or modify digital media items from a shared album corresponding to the sharing group. In one embodiment, all users have full permissions with respect to the shared album. In one embodiment, a user may choose when to join or leave a sharing group once the user is invited to the sharing group. In one embodiment, a user who creates a sharing group may determine the permissions for other users invited to join the sharing group.

In one embodiment, when a user adds a digital media item to a shared album, a reference to the digital media item is associated with the shared album. This may occur automatically in response to the user capturing the digital media item when the sharing group is currently selected by the user on the device that captured the digital media item. In one embodiment, the digital media item is also stored in association with the user that added the digital media item, such as by storing the digital media item in a folder corresponding to the user, or by storing a reference to the digital media item in association with the user.

In one embodiment, when a user removes a digital media item from a shared album, a reference to the digital media item is unassociated with the shared album, such as by removing the reference from a data structure corresponding to the shared album and/or the sharing group. In one embodiment, any user may remove a digital media item from the shared album, even if the user did not originally create the digital media item. In one embodiment, because the digital media item is also associated with the creating user that created the digital media item, the digital media item is still accessible to the creating user even after it is removed from shared album.

In one embodiment, when a second user modifies a digital media item added to a shared album by a first user, a new copy of the modified digital media item is stored, and a reference to the modified digital media item is associated with the shared album. In the shared album, the modified digital media item may either replace the original digital media item or be added in addition to the original digital media item. In one embodiment, the new copy of the modified digital media item is associated with the second user. Thus, the modified digital media item will be accessible to the second user even if the modified digital media item is removed from the sharing group, and the original digital media item will be accessible to the first user.

In one embodiment, when a particular user that belongs to a sharing group requests to leave the sharing group, the group management module 124 processes the request and removes the particular user from the sharing group. In one embodiment, removing the particular user includes removing, from a shared album associated with the sharing group, references to any digital media items that are stored in association with the particular user. In this case, when the particular user leaves the sharing group, the digital media items captured by the particular user are also removed from the corresponding shared album. Alternatively, other behavior may be implemented with respect to digital media items captured by the particular user upon the particular user's departure from a sharing group.

In one embodiment, the group management module 124 is implemented to allow for implicit user accounts. An implicit user account includes identifying information that identifies a user who has not registered for an account. An unregistered user may nevertheless be assigned identifying information based on unique network and/or device information. For example, if a user installs the shareable media application 110 on a particular device, the user may begin using the shareable media application 110 before creating an account by registration. The group management module 124 may create an implicit user account based on information about the particular device of the user. The identifying information of the implicit user account is used to track the activities of the user, including his membership in any sharing groups and media captured by the user.

Storage Servers

The shareable media management system 102 includes one or more storage servers 130-132 and one or more storage devices 112-114. Digital media items 120, user data 122 and sharing group data 138 may be stored on the one or more storage devices 112-114. The one or more storage devices 112-114 may include any storage system, including one or more databases, database servers, data centers, file servers, or any combination thereof.

In one embodiment, storage servers 130-132 include a content-addressable storage system. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. In contrast to conventional file systems, content-addressable storage systems allow applications to retrieve items from storage based on data that is generated from the content of the items, such as a hash value for the content.

As used herein, the term block refers to a block of data stored in a content-addressable storage system. In one embodiment, a block is a physically contiguous block of data stored on a storage device 112-114. In a content-addressable storage system, a block is retrieved using the hash value or other content-based key.

In one embodiment, sharing group data 138 for a particular sharing group includes one or more blocks that represent a shared album. The shared album may be logically stored as a folder structure, such as a folder emulated in a content-addressable storage system. As used herein, the term folder refers to a set of files presented as a group. In one embodiment, the shared album may be presented as a directory structure comprising a hierarchy of folders, each representing a group of files and/or other folders. The folder structure and/or directory structure may logically emulate a traditional folder and/or directory structure even if the underlying data is stored in a content-addressable storage system that does not have an underlying file system structure based on folders and/or directories. In one embodiment, a shared album comprises a logical folder that represented by a set of hierarchical blocks stored in a content-addressable storage system in accordance with U.S. patent application Ser. No. 14/086,197, entitled "Representing Directory Structure in Content-addressable Storage Systems," filed on Nov. 21, 2013, which is hereby incorporated by reference in its entirety. Because the sharing group data 138 includes a set of references that is updated when digital media items are added and/or removed, using a set of hierarchical blocks to represent the corresponding shared album controls the amount of data that must be updated when references are added or removed.

In one embodiment, user data 122 also includes one or more folder structures and/or directory structures that represent digital media items associated with one or more users. The folder structures and/or directory structures corresponding to a particular user may also be represented by a set of hierarchical blocks stored in a content-addressable storage system.

User Data and Sharing Group Data

Figure 2:
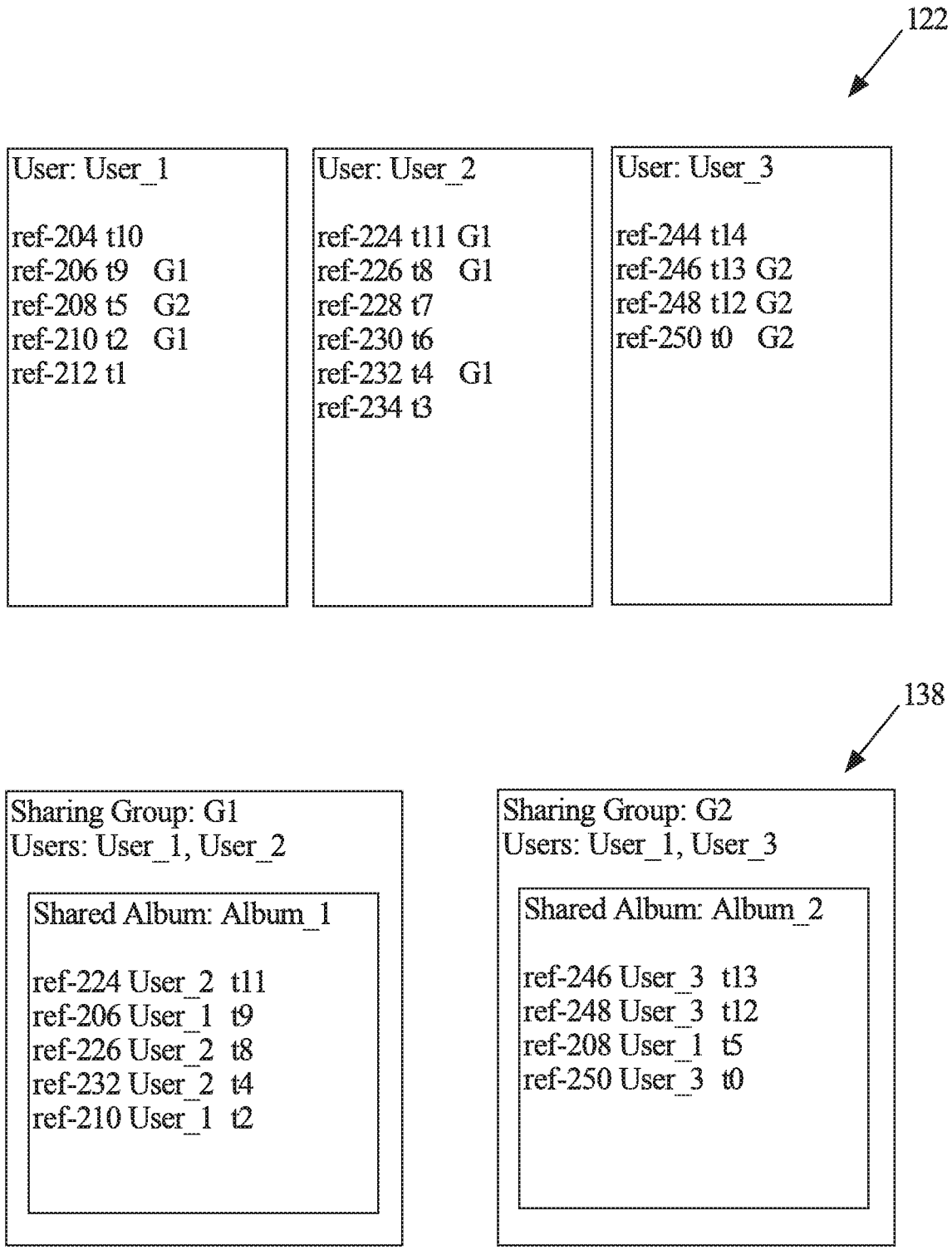
FIG. 2 is a block diagram depicting an embodiment of user data and sharing group data.

FIG. 2 is a block diagram depicting an embodiment of user data and sharing group data. A logical grouping of user data 122 and sharing group data 138 is shown. The grouping shows the relationships for purposes of explanation and does not require any specific data structure to be modeled after the grouping. For example, timestamps and sharing group identifiers are shown for each reference 204-250 with respect to user data 122, and timestamps and user identifiers are shown for each reference 204-250 with respect to sharing group data 138. However, any method of implementing the relationships may be used.

User data 122 for a particular user includes references 204-250 to digital media items captured by the particular user. The references 204-250 allow the digital media items to be stored in association with the respective users. For example, user data for User_1 includes references 204-212 for digital media items that were captured by User_1; user data for User_2 includes references 224-234 for digital media items that were captured by User_2; and user data for User_3 includes references 244-250 for digital media items that were captured by User_3. In one embodiment, the actual digital media items are stored in a folder corresponding to the respective user. As shown, the references to the digital media items are used to associate the users and the digital media items, and the actual storage location of the digital media item is independently managed, such as by a storage server 130-132.

Timestamps t1-t14 indicate a time at which the respective digital media item was captured. The timestamps t1-t14 are usable to determine an order that the digital media item was captured with respect to other digital media items. For example, timestamps t1-t14 may be based on an actual system time at a device capturing the digital media item, a system time provided by a server, or other logical time data provided by a server. Although timestamps are shown in user data 122, it is not necessary to specifically store timestamps in the user data 122 in every implementation. In one embodiment, the user data does not include a timestamp, and the references to associated digital media items are ordered based on the order in which the respective user captured the corresponding digital media items.

Group identifiers G1-G2 are shown in the user data 122, indicating that a particular digital media item referenced by a particular reference was captured on a device when a particular sharing group was currently selected on the device at the time that the digital media item was captured. For example, sharing group G1 was currently selected on a device of User_1 at time t9 when the digital media item referenced by ref-206 was captured on the device. Although the group identifiers are shown in user data 122, it is not necessary to specifically store the group identifier in the user data 122 in every implementation.

In one embodiment, each user may also capture digital media items when no sharing group is currently selected. For example, User_1 captured the digital media items referenced by ref-204 and ref-212 when no sharing group was currently selected on a corresponding device. In this case, the digital media items referenced by ref-204 and ref-212 are associated with User_1 and are not associated with any sharing group.

Sharing group data 138 is maintained for sharing groups G1 and G2. User_1 and User_2 are members of sharing group G1. User_1 and User_3 are members of sharing group G2. A shared album Album_1 is maintained for sharing group G1, and a shared album Album_2 is maintained for sharing group G2. When any user belonging to a particular sharing group captures a digital media item on a device while the particular sharing group is selected on the device, the digital media item is automatically shared with the particular sharing group. In one embodiment, the digital media item is automatically uploaded and the digital media item is associated with the sharing group by adding a reference to the corresponding shared album. For example, when User_1 captures the digital media item referenced by ref-210 while sharing group G1 is currently selected by User_1, the reference ref-210 is added to the shared album S1. In one embodiment, the references in each shared album are ordered based on time such that the order of the digital media items of a shared album are displayed in reverse time order. That is, the most recently captured digital media items are displayed first. Alternatively, any other ordering scheme may be implemented.

Client Sharing Group Application

Shareable media management system 102 may support a plurality of client devices 104-106. That is, the system architecture may be scaled to support any number of users, each of which can use one or more client devices 104-106. Client devices 104-106 are communicatively linked to the shareable media management system 102 via the Internet. Client devices 104-106 may include computing devices, including but not limited to workstations, personal computers, laptop computers, personal digital assistants (PDAs), tablet devices, mobile devices such as smart phones, and any other computing device.

In one embodiment, users capture digital media items on a client device 104-106 associated with the user. For example, a user may be logged in or otherwise authenticated to use a shareable media application 110 running on a client device 104-106. An embodiment may allow a user to use the shareable media application 110 on multiple client devices 104-106, and/or allow multiple users to use the shareable media application 110 a single client device 104-106. The shareable media application 110 captures digital media items using a capture device that is part of or connected to the client device 104-106.

As used herein, the term "application" refers to one or more integrated software components and an allocation of computational resources, such as memory and processes of a client device 104-106. The shareable media application 110 includes a media capture module 134 and an album display module 136. Although the media capture module 134 and an album display module 136 are illustrated as blocks of the shareable media application 110, one or more of the aforementioned modules may be implemented as one or more integrated modules.

The media capture module 134 allows a user to capture digital images while a particular sharing group is selected from a plurality of available sharing groups that the user belongs to. The album display module 136 allows a user to view shared albums corresponding to the plurality of available sharing groups that the user belongs to.

Selection Interface

Figure 3A:
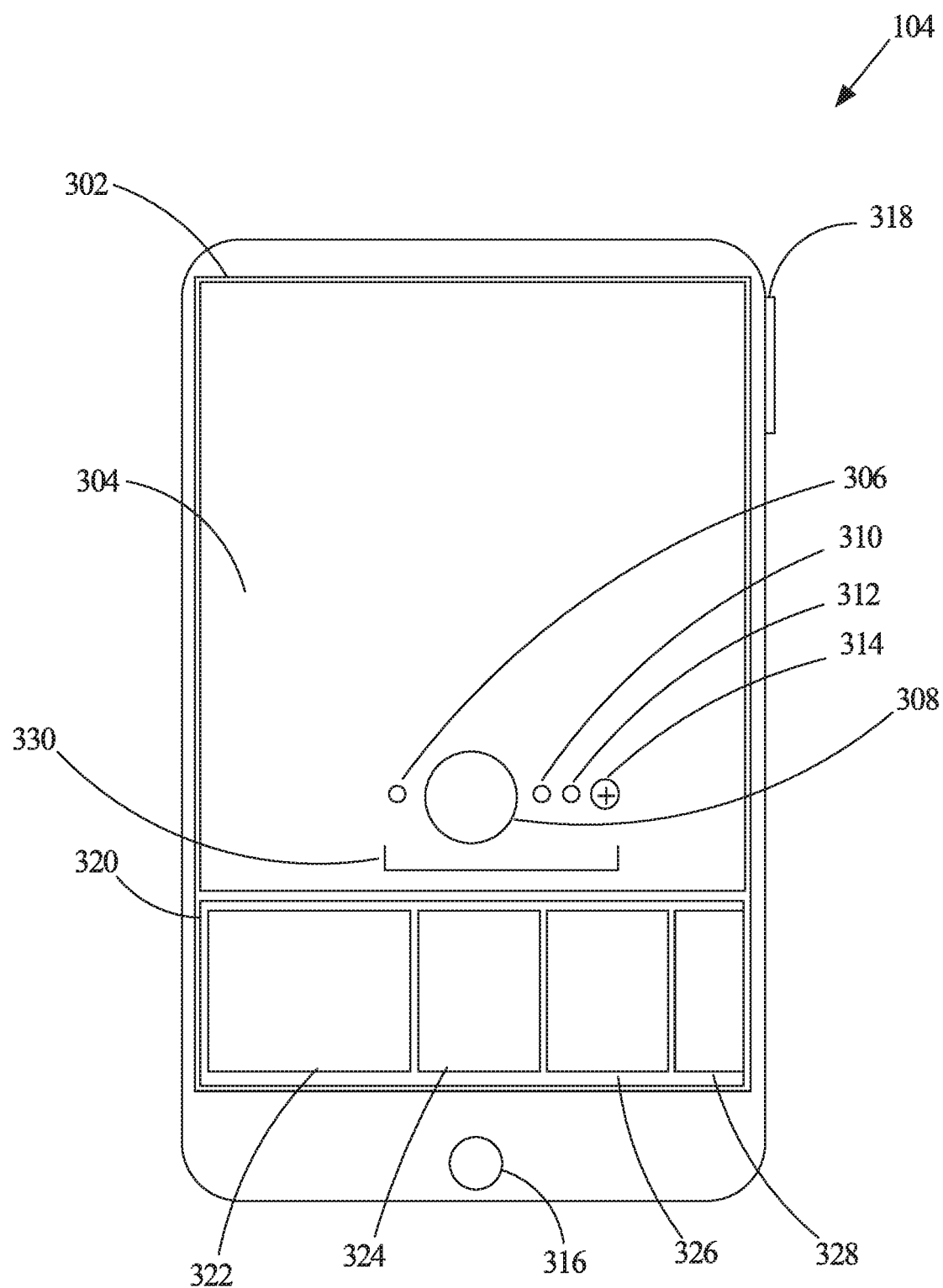
FIGS. 3A-3B illustrate embodiments of a user interface presented on a client device.

FIG. 3A illustrates an embodiment of a user interface presented on a client device. Client device 104 includes a display 302. The shareable media application 110 causes the client device 104 to display a selection interface 330. The selection interface 330 includes controls for selecting one of a plurality of available sharing groups that include the current user of the shareable media application 110. In one embodiment, each available sharing group that the current user belongs to is represented by an indicator 306-312. For example, the selection interface 330 may include a page indicator interface that includes an indicator 306-312 representing each available sharing group. In one embodiment, the display 302 has a touch screen interface, and the selection interface 330 includes controls for selecting a changing a currently-selected sharing group by swiping across the display 302.

The shareable media application 110 also provides a capture control that, when activated, causes a digital media item to be captured by a capture device. The capture device is part of or connected to the client device 104. Examples of a capture device include an imaging device, a video recording device, an audio recording device, and/or any other device capable of capturing digital media. The shareable media application 110 may display a live viewfinder 304 which displays a preview of digital content that may be captured by the capture device.

The capture control behaves like a shutter control, a start button, or other control for the capture device. In one embodiment, the shareable media application 110 provides a capture control that activates in response to input from a hardware button 316-318. In one embodiment, the display 302 has a touch screen interface, and the shareable media application 110 provides a capture control that activates in response to touch input on the display 302. In one embodiment, the selection interface 330 include an enlarged indicator 308 for the currently-selected sharing group, and the capture control is activated in response to touch input on the enlarged indicator 308.

In one embodiment, the selection interface 330 includes a creation control 314 for creating a new sharing group. The selection interface 330 may also include a control for selecting a personal camera. For example, a personal camera may be represented by a personal indicator that is displayed in addition to the indicators 306-312 for available sharing groups. When the personal camera is selected, no sharing group is selected. When the capture control is activated when no sharing group is selected, the digital media items that are captured are not shared with any sharing group. Such unshared digital media items may still be automatically uploaded and stored in association with the user that captured the unshared digital media item.

In one embodiment, a user may select multiple currently-selected sharing groups. When multiple currently-selected sharing groups are selected, when the capture control is activated, the digital media items that are captured are automatically shared with all of the currently-selected sharing groups.

Capture Filter

In one embodiment, a user can select one or more capture filters for capturing digital media items. A capture filter corresponds to a digital effect that can be digitally applied to a digital media item. Examples of digital effects include white balance effects, other lighting effects, contrast effects, framing effects, gradient effects, color effects, blurring effects, a resolution change, a file format change, artistic effects, and any other digital effect that can be applied to a digital media item. For example, a user may apply a black-and-white capture filter for a sharing group for an artistic project. As another example, a user may apply a macro capture filter for a sharing group for insect photos.

In one embodiment, when a capture filter is associated with a currently-selected sharing group, the capture filter will be applied to a digital media item after capturing the digital media item and before sharing the digital media item with the currently-selected sharing group. That is, when the capture control is activated, a digital media item is captured, the digital media item is processed by applying one or more digital effects, and the processed digital media item is uploaded. Thus, the media upload module 128 receives and adds the already-processed digital media item to the shared album associated with the currently-selected sharing group.

Album Display Interface

The shareable media application 110 causes the client device 104 to display an album display interface 320. The album display interface 320 displays digital content items in a shared album corresponding to a sharing group that a user belongs to. The shared album corresponding to a particular sharing group includes digital media items that were captured on one or more devices by one or more users when the particular sharing group was currently selected on the one or more devices. In one embodiment, an album key frame is selected from one of the digital media items of the shared album to represent the shared album in the shareable media application 110.

The album display interface 320 may display one or more previews 322-328 of the digital media items in the shared album. For example, the previews 322-328 may include low-resolution images corresponding to one or more digital media items or other icons that represent the digital media item. In one embodiment, previews 322-328 may include one or more space-fillers that are rendered with an aspect ratio of a digital media item until more data is available, such as an image preview. In one embodiment, the digital media item is a video, and a video key frame is selected as an image preview.

The album display interface 320 is configured to display digital content items belonging to a shared album corresponding to a currently-selected sharing group. In one embodiment, the album display interface 320 is also configured to display digital content items belonging to a personal album of the user, such as when no sharing group is currently selected.

In one embodiment, the shareable media application 110 may display the album display interface 320 at the same time that the selection interface 330, live viewfinder display 304 and/or the capture control is provided. Alternatively and/or in addition, the shareable media application 110 may exclusively display the album display interface 320 in one or more states of the shareable media application 110. When the album sharing interface 320 is displayed in conjunction with such the selection interface 330, the album sharing interface 320 may change the album that is displayed when the currently-selected sharing group is changed.

The shareable media application 110 obtains data corresponding to the digital media items in a particular shared album from the media serving module 126 of the application server 116. In one embodiment, when the album sharing interface 320 is displayed on the client device 104, new digital media items added to the particular shared album are displayed as soon as the corresponding data is received.

In one embodiment, initial media metadata for a new digital media item is provided to the client device 104 for display without waiting for another user to finish uploading the new digital media item. For example, a user of a second device may capture a new digital media item with a particular aspect ratio and begin uploading the new digital item to the media upload module 128. The media upload module 128 receives the particular aspect ratio first and provides the particular aspect ratio to the client device 104 even if the upload of the new digital media item from the second device is not yet complete. The client device 104 may use the particular aspect ratio to generate a new preview 322, allowing for the new preview 322 to be displayed in near real-time. That is, the user the client device 104 is made aware of the new digital media item in the shared album for the currently-selected sharing group almost as soon as the new digital media item is taken. The delay involves the upload and transmittal of initial media metadata that is small compared to the size of the new digital media item itself.

Viewing Filter

In one embodiment, a user can select one or more viewing filters for viewing one or more shared albums. A viewing filter corresponds to a digital effect that can be digitally applied to a digital media item. A user may select a different viewing filter for different shared albums, or the same viewing filter for all shared albums. For example, a user may choose to view all digital media items in one or more shared albums with a high contrast filter applied. In one embodiment, a user may select a different viewing filter for different devices that the same user uses to view digital content. For example, a user may select a low-resolution filter to reduce data usage on a cellular device.

A user's viewing filter preferences may be managed and stored by the shareable media management system 102. In one embodiment, the viewing filter preferences of a user are applied to digital media items before the digital media items are served to the user's device. For example, the media serving module 126 may apply the viewing filter to a digital media item before transmitting the processed digital media item to the album display module 136 on a client device 104-106.

Example Navigation Control Scheme

In one embodiment, a navigation control scheme is implemented for a shareable media application 110 running on a client device 104-106. The navigation control scheme allows a user to change between a capture mode for capturing shared digital media items and a viewing mode for viewing shared albums. The navigation control scheme also allows a user to switch between sharing groups.

Figure 3B:
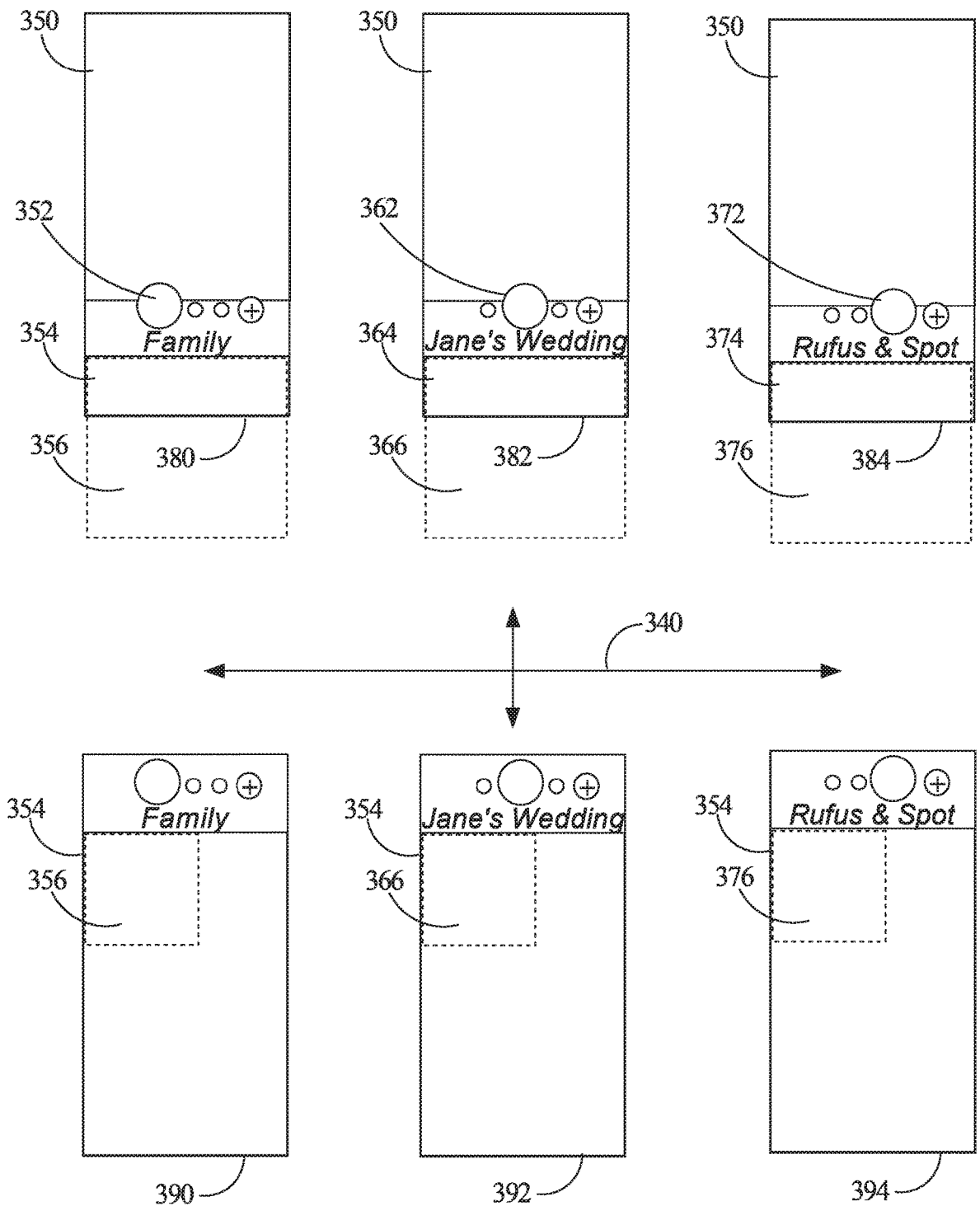

In FIG. 3B, an embodiment of a navigation control scheme is described. Screens 380-394 illustrate a display generated on a client device in different states of the shareable media application. The navigation control scheme 340 is based on 4 inputs: up, down, left and right. Each input will change a state of the shareable media application on a client device. In one embodiment, the 4 inputs of the navigation control scheme 340 are touchscreen inputs. For example, swipe input on a touchscreen may be interpreted as an up, down, left or right input with respect to the navigation control scheme 340. In one embodiment, the navigation control scheme includes two input axes: a view-capture axis and a sharing group axis. Input along the view-capture axis changes the state of the shareable media application between a capture mode and a viewing mode. Input along the sharing group axis changes the currently-selected sharing group.

In one embodiment, an up input changes the state of the shareable media application to capture mode. In capture mode, a user can capture digital media items for sharing with the currently-selected sharing group. The capture interface is fully displayed in capture mode, including a live viewfinder display 350. In one embodiment, a reduced album display interface 354 is displayed in capture mode. For example, in screen 380, the page indicator/capture control 352 indicates that the currently-selected sharing group is "Family"; the reduced album display interface 354 displays a portion of the last digital media item 356 shared with the "Family" sharing group by any member. In screen 382, the page indicator/capture control 362 indicates that the currently-selected sharing group is "Jane's Wedding"; the reduced album display interface 364 displays a portion of the last digital media item 366 shared with the "Jane's Wedding" sharing group by any member. In screen 384, the page indicator/capture control 372 indicates that the currently-selected sharing group is "Jane's Wedding"; the reduced album display interface 374 displays a portion of the last digital media item 376 shared with the "Jane's Wedding" sharing group by any member.

In one embodiment, a down input changes the state of the shareable media application to viewing mode. In viewing mode, a user can view digital media items in a particular shared album corresponding to a currently-selected sharing group. In one embodiment, when the state is changed from capture mode to viewing mode, the reduced album display interface 354, 364 and 374 expands. For example, in screens 390-394, an expanded view of the corresponding shared album is displayed in viewing mode.

In one embodiment, left inputs and right inputs change the state of the sharable media application between different sharing groups that the user is a member of. In the example shown, when the currently-selected sharing group is "Jane's Wedding," swiping left will select the sharing group "Family" while swiping right will select the sharing group "Rufus & Spot."

Mimicking a Plurality of Camera Devices

In one embodiment, the shareable media application 110 provides an interface that mimics, within a sharing group, a single capture device that is shared between all users that belong to the sharing group. For example, the shareable media application 110 may mimic one or more cameras or other image capture devices. Although the users may run the shareable media application 110 on different client devices 104-106, the shareable media application 110 automatically adds each captured digital media item to the same shared album when the same sharing group is selected. Likewise, the shareable media application 110 displays digital media items captured by other users in near real-time as if the digital media items were captured by the same device. For example, the digital media items may be displayed in the order that they were captured, regardless of the device used to capture each digital media item. In one embodiment, each user belonging to a sharing group has full permissions to add, remove or modify digital media items in the corresponding shared album. Thus, the shareable media application 110 simulates the experience that a user of a single physical camera that is physically shared among multiple users.

Alternatively and/or in addition, the shareable media application 110 may provide an interface that mimics, on a single client device 104, multiple capture devices, such as multiple physical cameras. For example, a physical camera may be simulated for each available sharing group. For example, the enlarged indicator 308 may be rendered and/or animated to simulate a shutter of a capture device. When the currently-selected sharing group is changed, a different indicator corresponding to the newly-selected sharing group may be enlarged as if a different shutter is used. The shareable media application 110 may also render and/or animate a simulation of a device change on the display, such as by simulating a device change with respect to the live viewfinder display 304. Furthermore, when the currently-selected sharing group is changed, an album displayed in the album display interface 320 may be switched to the shared album corresponding to the newly-selected sharing group. Thus, the shareable media application 110 simulates the experience of a user putting down and picking up a different physical camera.

Subscribers and Publishers

In one embodiment, permissions are used to create a publisher-subscriber model for a particular sharing group. One or more publisher members of the particular sharing group have full permissions, including read and write access to the corresponding shared album. Thus, the one or more publisher members are able to control the content in the shared album. One or more subscriber members of the particular sharing group have read-only permissions. The one or more subscriber members are only able to view the content that is managed by the one or more publisher members.

Example Capture Process

Figure 4:
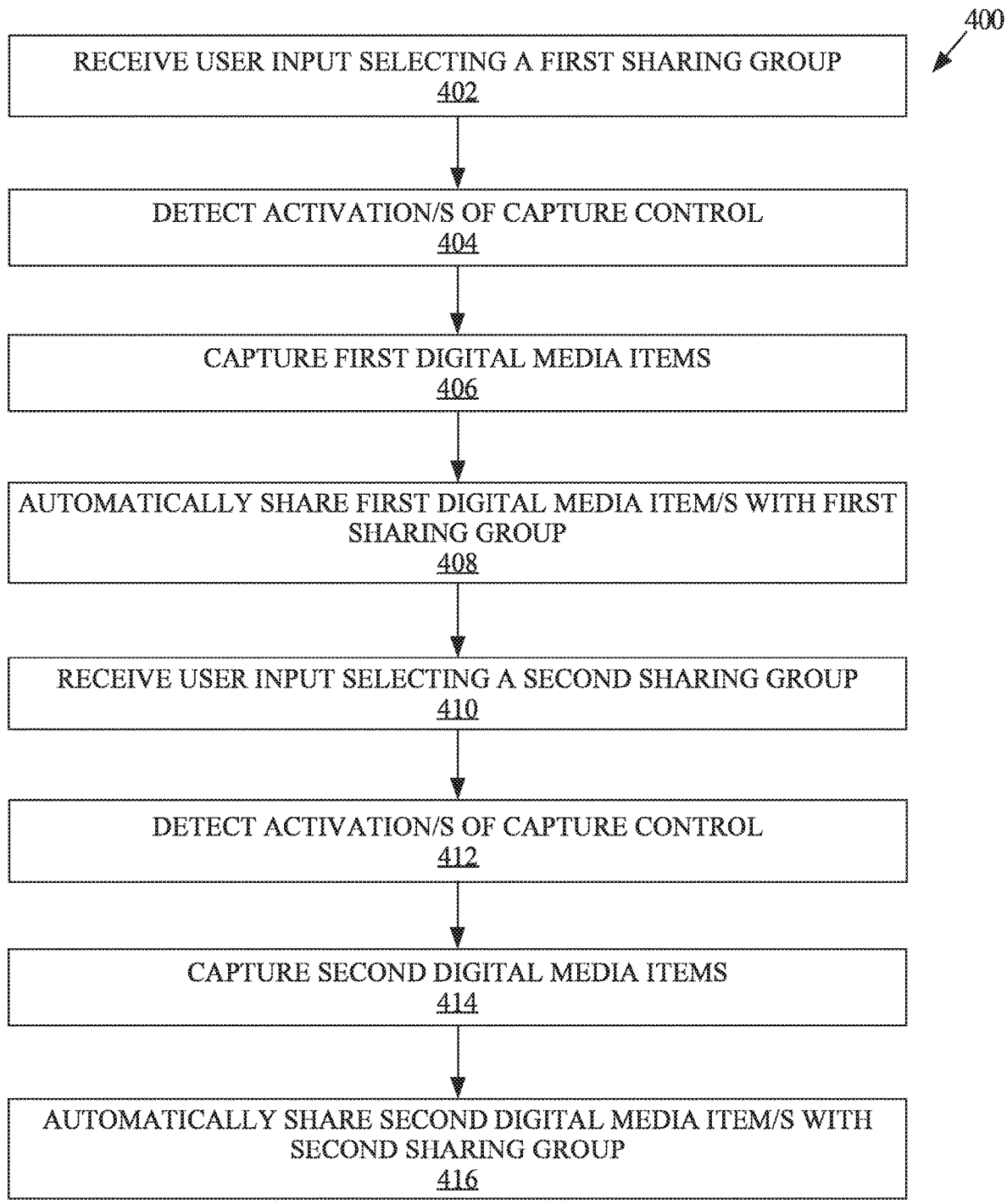
FIG. 4 is a flow diagram that illustrates an embodiment of a process for capturing digital media items in association with different sharing groups.

FIG. 4 is a flow diagram that illustrates an embodiment of a process for capturing digital media items in association with different sharing groups. Process 400 may be performed by one or more computing devices and/or processes thereof. For example, one or more blocks of process 400 may be performed by computer system 600. In one embodiment, one or more blocks of process 400 may be performed by a shareable media application 110 running on a client device 104-106.

At block 402, the shareable media application 110 receives user input selecting a first sharing group. In one embodiment, the shareable media application 110 displays a selection interface on a device that includes controls for selecting one of a plurality of available sharing groups to be a currently-selected sharing group. In response to the user input selecting the first sharing group, the shareable media application 110 sets a first sharing group as the currently-selected sharing group.

At block 404, the shareable media application 110 detects a first one or more activations of a capture control. The first activation/s are detected while the first sharing group is the currently-selected sharing group. The capture control is provided by the shareable media application 110. When activated, the capture control causes digital media items such as digital photos or digital video to be captured.

At block 406, the shareable media application 110 captures one or more first digital media items in response to the first one or more activations.

At block 408, the shareable media application 110 automatically shares the first digital media item/s with a first set of users that corresponds to the first sharing group. In one embodiment, the shareable media application 110 automatically shares the first digital media item/s with the first set of users by automatically transmitting the first digital media item/s to an application server 116-118 of a shareable media management system 102. The first digital media item/s are automatically transmitted in response to each first activation of the capture control. In one embodiment, the shareable media management system 102 stores the first digital media item/s and updates data for the first sharing group, such as by adding first reference/s to a first shared album corresponding to the first sharing group. When other users of the first sharing group access the first shared album, the first media items are available to the other users of the first sharing group.

At block 410, the shareable media application 110 receives user input selecting a second sharing group. In response to the user input selecting the second sharing group, the shareable media application 110 sets a second sharing group as the currently-selected sharing group.

At block 412, the shareable media application 110 detects a second one or more activations of the capture control. The second activation/s are detected while the second sharing group is the currently-selected sharing group.

At block 414, the shareable media application 110 captures one or more second digital media items in response to the second one or more activations.

At block 416, the shareable media application 110 automatically shares the second digital media item/s with a second set of users that corresponds to the second sharing group.

Example Upload Process

Figure 5:
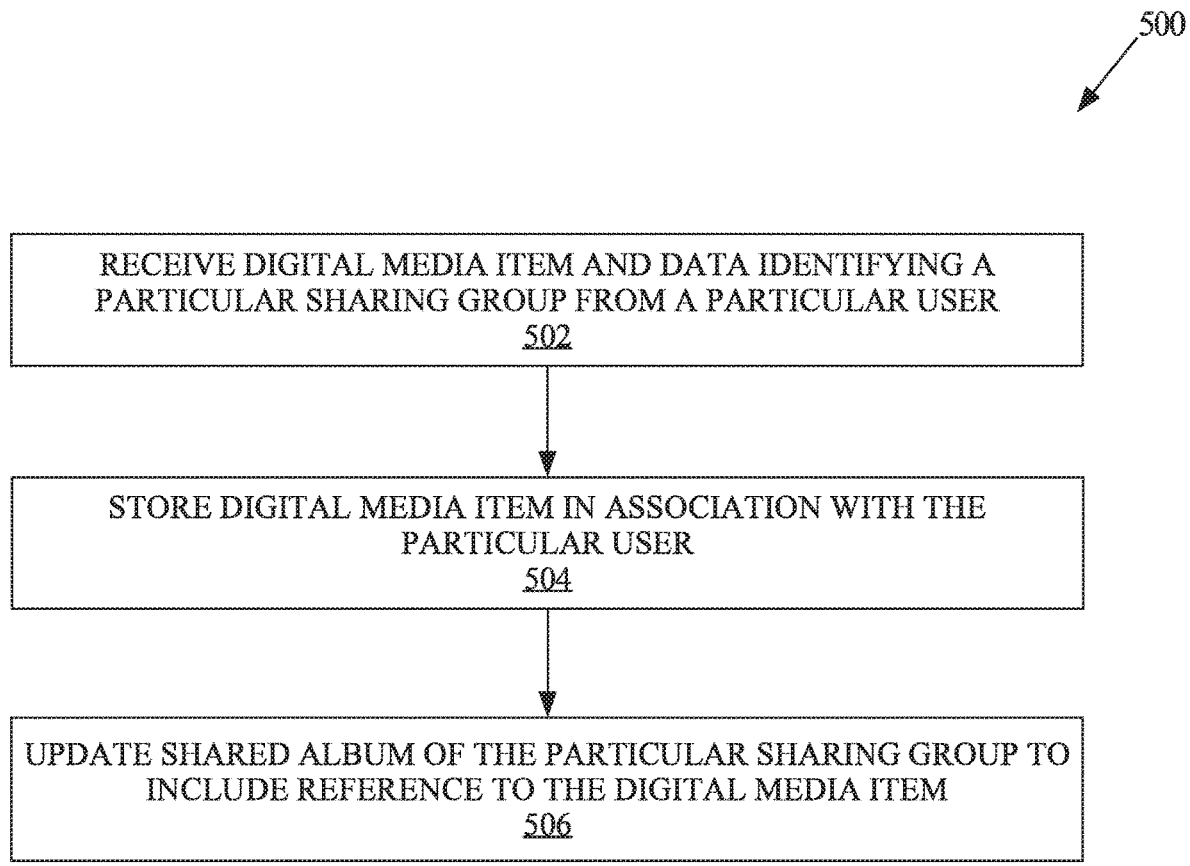
FIG. 5 is a flow diagram that illustrates an embodiment of a process for handling a digital media item captured in association with a particular sharing group.

FIG. 5 is a flow diagram that illustrates an embodiment of a process for handling a digital media item captured in association with a particular sharing group. Process 500 may be performed by one or more computing devices and/or processes thereof. For example, one or more blocks of process 500 may be performed by computer system 600. In one embodiment, one or more blocks of process 500 are performed by an application server 116-118 and/or a storage server 130-132 of a shareable media management system 102.

At block 502, the shareable media management system 102 receives a digital media item and data identifying a particular sharing group. The particular sharing group is one of a plurality of sharing groups maintained by the shareable media management system 102. In one embodiment, the digital media item and the data identifying the particular sharing group are received, by a media upload module 128 of an application server 116, from an application running on a device associated with a particular user who belongs to the particular sharing group. The particular sharing group is selected on the device at the time that the digital media item was captured on the device. In one embodiment, the application running on the device causes the digital media item to be transmitted automatically in response to its capture.

At block 504, the shareable media management system 102 stores the digital media item in association with the particular user. In one embodiment, the media upload module 128 causes a storage server 130-132 in a storage device 112-114 of the shareable media management system 102. In one embodiment, the shareable media management system 102 comprises a content-addressable storage system, and the digital media item is stored as one or more first blocks in the content-addressable storage system. The association between the particular user and the digital media item is stored by updating one or more second blocks associated with the particular user to include a reference to the one or more first blocks corresponding to the digital media item.

At block 506, the shareable media management system 102 updates a shared album associated with the particular sharing group to include a reference to the digital media item. In one embodiment, the shareable media management system 102 comprises a content-addressable storage system, and updating the shared album comprises updating one or more third blocks to include a reference to the one or more first blocks corresponding to the digital media item.

Example Implementation System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
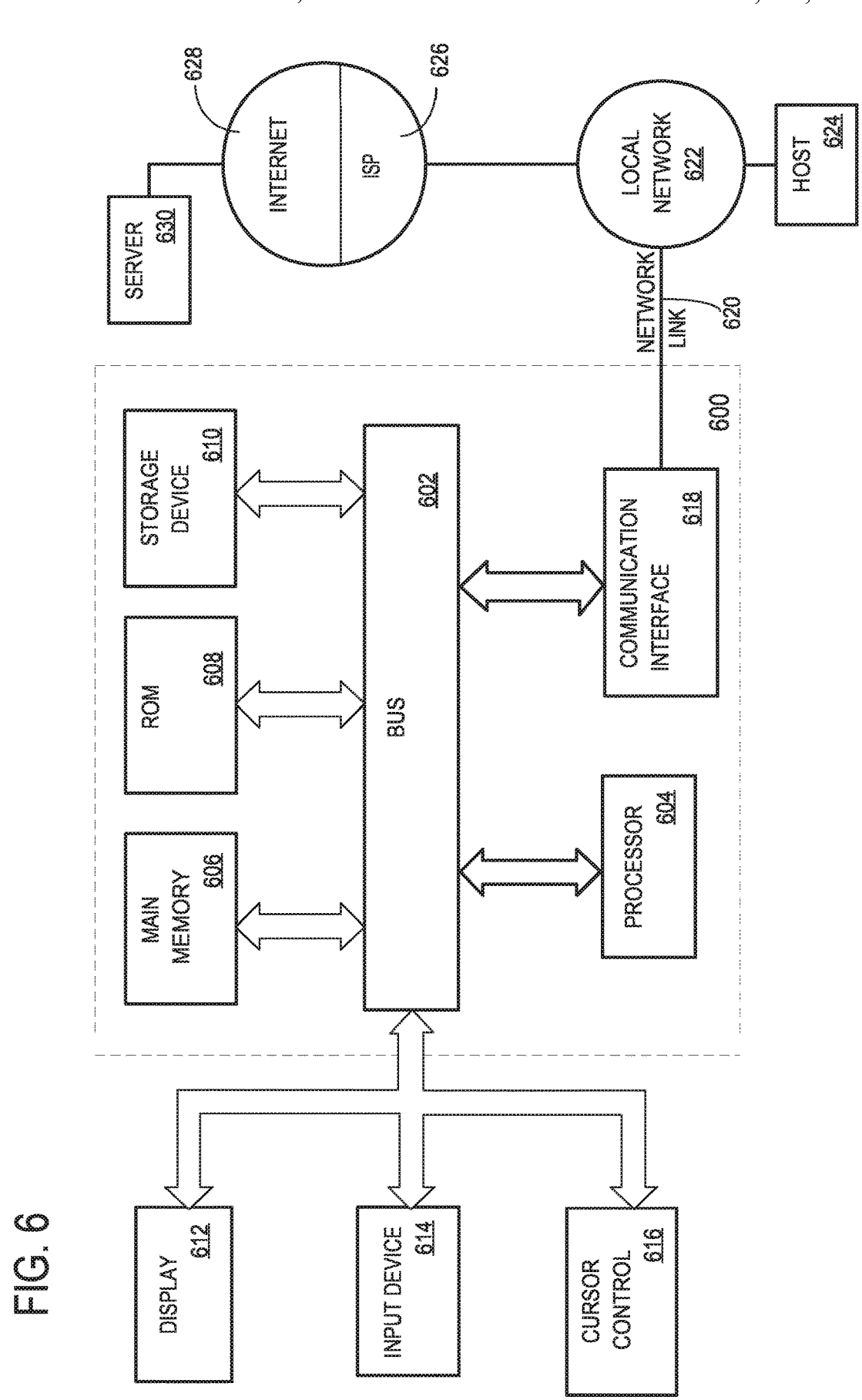
FIG. 6 illustrates a computer system upon which one or more embodiments may be implemented.

For example, FIG. 6 is a block diagram that depicts a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A device for sharing captured digital items, the device comprising:
 a display configured to show a selection interface comprising:
  indicators for a plurality of available sharing groups, each indicator comprising a representation of a sharing group in the plurality of available sharing groups; and
  a capture control comprising an enlarged representation of a currently-selected sharing group from the plurality of available sharing groups within the indicators; and
 one or more processors configured to:
  in response to an activation of the capture control:
   cause one or more digital media items to be captured; and
   cause the one or more digital media items to be shared with a plurality of users in the currently-selected sharing group.

2. The device of claim 1, wherein the one or more digital media items comprise at least one of digital photos and digital videos.

3. The device of claim 1, wherein the one or more processors are further configured to:
 in response to the activation of the capture control, automatically upload the one or more digital media items to one or more servers.

4. The device of claim 3, further comprising:
 a persistent storage,
 wherein no copy of the one or more digital media items are automatically stored on the persistent storage after the one or more digital media items are uploaded to the one or more servers.

5. The device of claim 3, wherein the one or more servers are configured to add the one or more digital media items to a first shared album corresponding to the currently-selected sharing group.

6. The device of claim 1, the display further configured to:
 in response to user input that causes a second sharing group to be selected as the currently-selected sharing group, update the capture control to display an enlarged representation of the second sharing group.

7. The device of claim 6, the one or more processors further configured to:
 in response to an activation of the updated capture control, cause a second set of one or more digital media items be shared with the second sharing group.

8. The device of claim 1, further comprising a media capture module configured to capture the one or more digital media items.

9. The device of claim 1, wherein the one or more processors are further configured to:
 detect a first user input corresponding to movement along a first axis;
 based on a direction of the first user input, change a state of a shareable media application between a capture mode and a viewing mode;
 detect a second user input corresponding to movement along a second axis; and
 based on a direction of the second user input, change the currently-selected sharing group.

10. The device of claim 1, wherein the display comprises a touch screen interface.

11. A method for sharing captured digital items, the method comprising:
 displaying a selection interface comprising:
  indicators for a plurality of available sharing groups, each indicator comprising a representation of a sharing group in the plurality of available sharing groups; and
  a capture control comprising an enlarged representation of a currently-selected sharing group from the plurality of available sharing groups within the indicators;
 receiving user input that causes a first sharing group to be selected as the currently-selected sharing group; and
 in response to detecting an activation of the capture control, causing one or more digital media items to be shared with a plurality of users in the currently-selected sharing group.

12. The method of claim 11, further comprising:
 in response to user input that causes a second sharing group to be selected as the currently-selected sharing group, updating the capture control to display an enlarged representation of the second sharing group.

13. The method of claim 12, further comprising:
 in response to an activation of the updated capture control, causing a second set of one or more digital media items be shared with the second sharing group.

14. The method of claim 11, further comprising:
 in response to the activation of the capture control, automatically uploading, to one or more servers, the one or more digital media items.

15. The method of claim 14, further comprising:
 adding, at the one or more servers, the one or more digital media items to a first shared album corresponding to the first sharing group.

16. The method of claim 11, further comprising:
 in response to detecting the activation of the capture control, capturing the one or more digital media items using a capture module.

17. The method of claim 11, further comprising:
 displaying a first shared album comprising first shared digital media items that were captured by users of the first sharing group on a first plurality of devices,
 wherein the first sharing group was selected on the first plurality of devices when the first shared digital media items were captured.

18. The method of claim 17, further comprising:
 while displaying the first shared album to a user of the first sharing group, receiving and displaying first additional shared digital media items captured by other users of the first sharing group on other devices,
 wherein the first sharing group was selected on the other devices when the first additional shared digital media items were captured.

19. The method of claim 11, further comprising:
 detecting a first user input corresponding to movement along a first axis;

based on a direction of the first user input, changing a state of a shareable media application between a capture mode and a viewing mode;

detecting a second user input corresponding to movement along a second axis; and based on a direction of the second user input, changing the currently-selected sharing group.

20. A device for sharing captured digital items, the device comprising:

means for displaying a selection interface comprising:
  indicators for a plurality of available sharing groups, each indicator comprising a representation of a sharing group in the plurality of available sharing groups; and
  a capture control comprising an enlarged representation of a currently-selected sharing group from the plurality of available sharing groups within the indicators; and means for processing, the means for processing configured to:
  in response to an activation of the capture control:
    cause one or more digital media items to be captured; and
    cause the one or more digital media items to be shared with a plurality of users in the currently-selected sharing group.

* * * * *